United States Patent
Wittmeijer

(10) Patent No.: US 6,932,184 B2
(45) Date of Patent: Aug. 23, 2005

(54) ELECTRIC STEERING SYSTEM WITH MECHANICAL BACK-UP DEVICE

(75) Inventor: Hans Henning Wittmeijer, Hilversum (NL)

(73) Assignee: SKF Engineering and Research Centre B.V., Nieuwegein (NL)

( * ) Notice: Subject to any disclaimer, the term of this patent is extended or adjusted under 35 U.S.C. 154(b) by 0 days.

(21) Appl. No.: 10/332,694

(22) PCT Filed: Jul. 13, 2001

(86) PCT No.: PCT/NL01/00538
§ 371 (c)(1),
(2), (4) Date: Jan. 23, 2003

(87) PCT Pub. No.: WO02/06109
PCT Pub. Date: Jan. 24, 2002

(65) Prior Publication Data
US 2004/0007418 A1    Jan. 15, 2004

(30) Foreign Application Priority Data
Jul. 14, 2000  (NL) ............................................ 1015723

(51) Int. Cl.$^7$ ............................................. B62D 5/083
(52) U.S. Cl. ...................................... 180/444; 180/443
(58) Field of Search ................................ 180/443, 444, 180/446, 402, 407, 405

(56) References Cited

U.S. PATENT DOCUMENTS

| | | | |
|---|---|---|---|
| 5,275,250 A | | 1/1994 | Müller et al. |
| 6,006,853 A | * | 12/1999 | Shimizu et al. ............. 180/444 |
| 6,053,273 A | * | 4/2000 | Shimizu et al. ............. 180/444 |
| 6,053,274 A | | 4/2000 | Ehara et al. |
| 6,116,371 A | * | 9/2000 | Suyama et al. ............. 180/444 |
| 6,138,788 A | * | 10/2000 | Bohner et al. ............. 180/405 |
| 6,419,043 B1 | * | 7/2002 | Duval et al. ................ 180/444 |
| 6,655,709 B2 | * | 12/2003 | Sherwin et al. ............. 280/402 |

FOREIGN PATENT DOCUMENTS

| | | |
|---|---|---|
| DE | 196 34 102 C1 | 12/1997 |
| DE | 196 25 350 A1 | 1/1998 |
| DE | 196 36 173 A1 | 3/1998 |
| EP | 0 931 711 A1 | 7/1999 |
| EP | 1 053 927 A1 | 11/2000 |

* cited by examiner

*Primary Examiner*—Tony Winner
(74) *Attorney, Agent, or Firm*—Oliff & Berridge, PLC

(57) ABSTRACT

A steering system for an automotive vehicle, includes a steering device to be operated by a driver, a rotatable connection having a drive end connected to the steering device and a drive end connectable to a linkage of the steering wheels of the vehicle. The drive end of the rotatable connection is provided with a first sensor, the driven end of the rotatable connection is provided with a second sensor and an electric motor, the first and second sensors being connected to a control device, the control device controlling the electric motor on the basis of signals emanating from the first and second sensors.

10 Claims, 1 Drawing Sheet

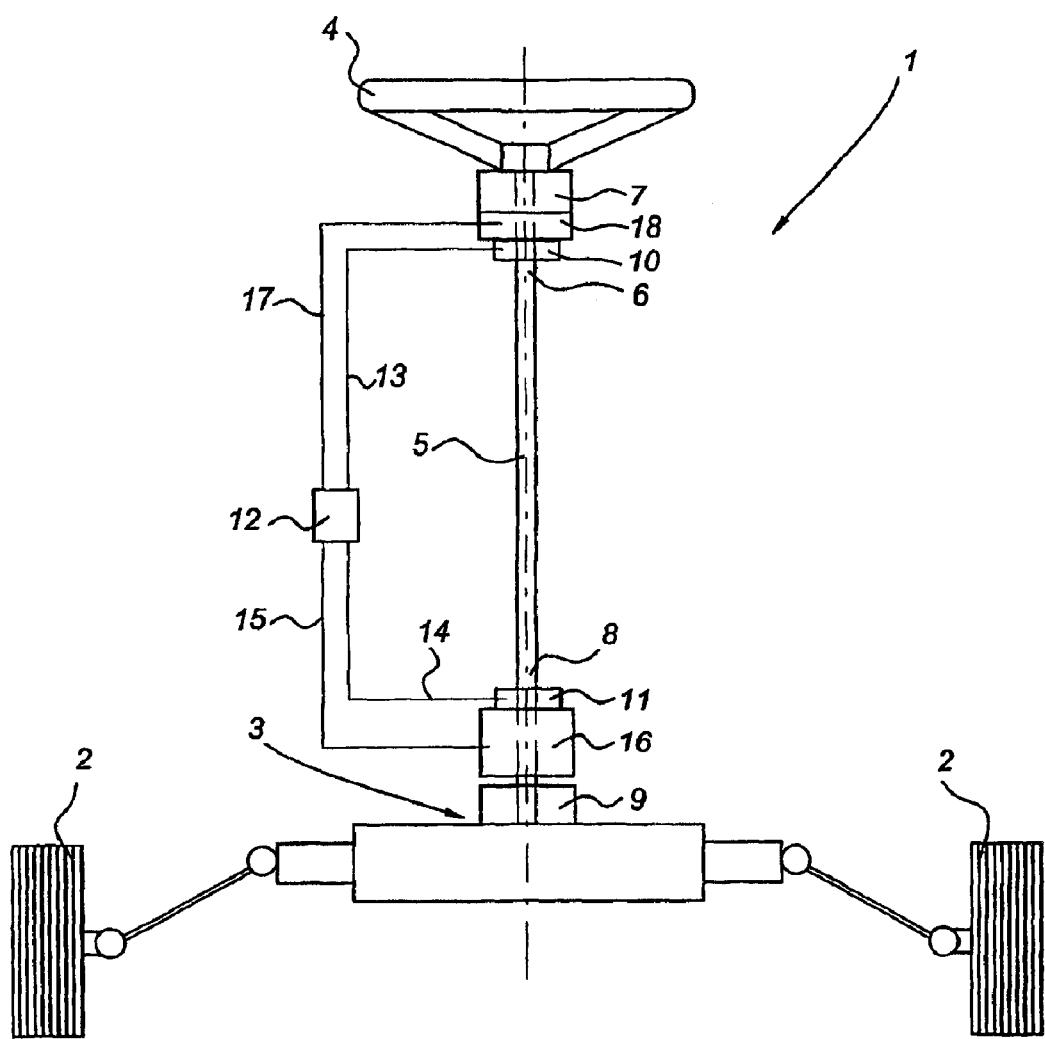

ELECTRIC STEERING SYSTEM WITH MECHANICAL BACK-UP DEVICE

BACKGROUND OF THE INVENTION

1. Field of Invention

The invention is related to a steering system for an automotive vehicle, comprising a steering device to be operated by a driver, a rotatable connection having a drive end connected to the steering device and a driven end connectable to a linkage of the steering wheels of the vehicle.

2. Description of Related Art

Such a steering system is known, and usually comprises a purely mechanical rotatable connection, e.g. a tubular shaft. Said shaft is also provided with an absorber mechanism for protecting the driver in case of a frontal collision.

Although such prior art steering system performs satisfactorily, it nevertheless has disadvantages as well. The short tubular shaft still may present a potential hazard to the driver. Furthermore, its application in the surrounding vehicle construction imposes limitations, on the vehicle design as well. Its routing from the steering wheel to the linkage is rather straightforward, and can hardly be varied or routed along a different path.

Usually, also a power assist device is connected to the steering system so as to alleviate the steering torque to be exerted by the driver on the steering wheel. Although generally hydraulic power assist devices are applied in this connection, electric power assist devices have been proposed as well. Such electric power assist devices have the advantage that no hydraulics are needed. The hydraulic oil, which presents environmental disadvantages, and the somewhat cumbersome lay out of hydraulic connections can then be dispensed with.

SUMMARY OF THE INVENTION

The object of the invention is to provide a steering system which can be applied in a more versatile way, and which does not have the disadvantages of the prior art hydraulically assisted steering devices. This object is achieved in that the drive end of the rotatable connection is provided with a first sensor, the driven end of the rotatable connection is provided with a second sensor and an electric motor, the first and second sensors being connected to a control device, said control device controlling the electric motor on the basis of signals emanating from the first and second sensors.

The electric motor can drive the driven end of the rotatable connection in several ways. First of all, the electric motor can act as a power assist device, analogous to the hydraulic assist devices. The rotatable connection in that case still delivers some torque for steering purposes. However, it is also possible to provide the full steering torque through the electric motor. In that case, the rotatable connection merely acts as a mechanical backup of the fully electric steering system in the case of e.g. an electric power failure.

Preferably, the first sensor is incorporated in a first bearing and the second sensor is incorporated in a second bearing, said bearings being connected to the rotatable connection for supporting said rotatable connection with respect to the vehicle. Such sensor bearings constitute standard available, proven components, and can easily and reliably be incorporated in the steering system.

In case the rotatable connection can be carried out as a mechanical backup drive, it can be a flexible torque cable, e.g. a Bowden cable. Such cable can be adapted more easily to the space constraints within a vehicle. Nevertheless, such cable may also be combined with a shaft portion.

Furthermore, the drive end of the rotatable connection can be provided with an accelerating gear drive and the driven end of the rotatable connection can be provided with a decelerating gear drive. Alternatively, a standard steering column can be used as a mechanical back-up drive.

As a result of the gear drives in question, the rotatable connection has a relatively high rotational speed. Thereby, it becomes possible to apply a rotatable connection, such as a Bowden cable or shaft, with relatively small cross-sectional dimensions without impairing the torsional stiffness of the steering system.

Moreover, a relatively high number of revolutions of the rotatable connection makes it possible to apply relatively simple sensors with only small resolution. The relatively high number of resolutions which exhibits the rotatable connection makes that such simple, economic sensors still can provide the required angular accuracy.

The sensors are positioned between the accelerating and the decelerating gear drives. The combined ratio can be selected to fit the steering design, but is often suitably selected as 1.

The electric motor can be positioned between the accelerating and the decelerating gear drives as well, other positions however are also possible, e.g. at the decelerating gear. Thus, an electric motor without gear reduction can be applied directly to the rotatable connection and to the linkage.

DETAILED DESCRIPTION OF EXEMPLARY EMBODIMENTS

The invention will now be described further with reference to an embodiment shown in the FIGURE.

The FIGURE shows a schematic lay out of an electric steering system 1 according to the invention, which is connected to the wheel 2 of a vehicle through a mechanical linkage 3 which is known per se and which will therefore not be described further.

The steering system 1 comprises a steering wheel 4 as well as a rotatable connection 5 which extends between the steering wheel 4 and the linkage 3. This rotatable connection 5 can for instance be carried out as a so-called Bowden cable, that is a flexible cable with a stationary hollow outer tubular cable, in combination with a rotationally stiff inner cable accommodated within the outer cable. Such Bowden cables are known per se as well, and will therefore not be detailed further. This rotatable connection can also be carried out as a shaft.

At its drive end 6 the rotatable connection 5 is connected to an accelerating gear drive (accelerating gearbox 7), which in turn is connected to the steering wheel 4.

At its driven end 8 the rotatable connection 5 is connected to a decelerating gear drive (decelerating gearbox 9), which in turn in connected to the linkage 3. The combined gear ratio of the accelerating gearbox 7 and the decelerating gearbox 9 can be 1; other ratios are possible as well.

At the output end of the accelerating gear box 7, a sensor bearing 10 is provided, and a similar sensor bearing 11 is provided at the input end of the decelerating gear box 9. These sensor bearings 10, 11 are connected to a control unit 12.

Upon rotating the steering wheel 4, the sensor bearing 10 senses the accelerated rotation at the output end of the accelerating gearbox 7. The control unit 12 receives signals from this sensor bearing 10 and also from the sensor bearing 11 at the input end of the decelerating gearbox 9. In case differences are measured, the control unit through line 15 delivers a control signal to the electric motor 16 so as to provide the desired rotational speed at the input end of the decelerating gear box 9, which of course depends on the rotations of the steering wheel 4.

Preferably, the electric steering motor 16 provides the full rotational torque required driving the linkage system. In that case, the rotatable connection 5 functions merely as a mechanical back up, which would take over the steering control in case of an electric power failure.

The steering device is connected to a force feedback motor 16 so as to simulate the forces which are exerted on the vehicle wheels during driving. This force feedback motor is controlled through line 17 by the control unit 12. The force feedback motor 18 obtains a signal related to the power which is needed to drive the steering motor 16. The more power is delivered by the steering motor 16 for a steering action of the wheels 2, the more torque is then transferred to the steering wheel 4 by the force feedback motor 18.

What is claimed is:

1. Steering system for an automotive vehicle, comprising a steering device to be operated by a driver, a rotatable connection having a drive end connected to the steering device and a driven end connectable to a linkage of the steering wheels of the vehicle, wherein the drive end of the rotatable connection is provided with a first sensor, the driven end of the rotatable connection is provided with a second sensor and an electric steering motor, the first and second sensors being connected to a control device controlling the electric steering motor on the basis of signal emanating from the first and second sensors, characterized in that the drive end of the rotatable connection is provided with an accelerating gear drive and in that the driven end of the rotatable connection is provided with a decelerating gear drive, the gear drives each having a rotational input member and a rotational output member.

2. Steering system according to claim 1, wherein the first sensor is incorporated in a first bearing and the second sensor is incorporated in a second bearing, said bearings being connected to the rotatable connection for supporting said rotatable connection with respect to the vehicle.

3. Steering system according to claim 2, wherein the rotatable connection comprises a flexible torque cable such as a Bowden cable.

4. Steering system according to claim 2, wherein the rotatable connection comprises a shaft.

5. Steering system according to claim 1, wherein the sensors are positioned between the accelerating and the decelerating gear drives.

6. Steering system according to claim 1, wherein the combined gear ratio of the accelerating and of the decelerating gear drives is about 1.

7. Steering system according to claim 6, wherein the electric motor is positioned between the accelerating and decelerating gear drives.

8. Steering system according to claim 1, wherein the steering device is connected to a force feedback motor.

9. Steering system according to claim 8, wherein the force feedback motor is controllable by means of the control device.

10. Steering system according to claim 8, wherein the force feedback motor is positioned between the accelerating and decelerating gear drives.

* * * * *